(12) United States Patent
Funamoto

(10) Patent No.: US 7,120,304 B2
(45) Date of Patent: Oct. 10, 2006

(54) IMAGE DATA COMPRESSING APPARATUS

(75) Inventor: Kenji Funamoto, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 723 days.

(21) Appl. No.: 10/337,867

(22) Filed: Jan. 8, 2003

(65) Prior Publication Data

US 2003/0128763 A1 Jul. 10, 2003

(30) Foreign Application Priority Data

Jan. 10, 2002 (JP) ............................. 2002-002899

(51) Int. Cl.
*G06K 9/36* (2006.01)
*G06K 9/46* (2006.01)
(52) U.S. Cl. ..................... 382/239; 382/248
(58) Field of Classification Search ............... 382/239, 382/248, 250

See application file for complete search history.

(56) References Cited

U.S. PATENT DOCUMENTS 5,249,053 A * 9/1993 Jain ....................... 348/207.99
5,627,916 A * 5/1997 Horiuchi .................... 382/239
5,633,976 A * 5/1997 Ogino ...................... 386/120
6,314,206 B1 * 11/2001 Sato ......................... 382/235

FOREIGN PATENT DOCUMENTS

JP  4-203884  2/1994

* cited by examiner

Primary Examiner—Phuoc Tran
(74) Attorney, Agent, or Firm—Sughrue Mion, PLLC

(57) ABSTRACT

When an nth frame of encoded data is stored in a compressed-data storage area that stores 15 frames of encoded data, a target amount of code of the nth frame is decided so as to become a value that is the result of dividing the residual capacity of an area remaining in the compressed-data storage area by the number of remaining images to be stored in this remaining area. This makes it possible to prevent the target amount of code from becoming very large or very small. Even if there is a change in a photographic scene, therefore, a drastic change in image quality from frame to frame can be prevented.

4 Claims, 11 Drawing Sheets

IMAGE DATA COMPRESSING APPARATUS

BACKGROUND OF THE INVENTION

1. Field of the Invention

This invention relates to an image data compressing apparatus for generating encoding data by subjecting image data representing one frame of an image to calculation of orthogonal transform coefficients, quantization of the orthogonal transform coefficients and encoding of the quantized orthogonal transform coefficients, and storing the generated encoded data in a storage area having a capacity for storing a plurality of frames of encoded data.

2. Description of the Related Art

The motion JPEG (Joint Photographic Experts Group) format is one example of a moving image compression format. According to motion JPEG, image data obtained by subjecting a plurality of frames of still images to JPEG compression is expanded and displayed continuously to thereby present the image data as a moving image. In order to hold the recording time of the moving image substantially constant in such a moving image compression format, it is required that the amount of compressed image data (amount of encoded data) per unit time (one second) be made substantially constant (JP4-203884).

However, if the compression rate of each individual frame is fixed, the amount of compressed image data may change drastically when the scene changes. If this occurs, the amount of compressed image data per unit time cannot be rendered substantially constant.

SUMMARY OF THE INVENTION

Accordingly, an object of the present invention is to render the amount of image data after compression substantially constant.

According to the present invention, the foregoing object is attained by providing an image data compressing apparatus comprising: an encoded data device (encoded data means) for generating encoding data by subjecting image data representing one frame of an image to calculation of orthogonal transform coefficients, quantization of the orthogonal transform coefficients and encoding of the quantized orthogonal transform coefficients; a storage controller (storage control means) for storing the encoded data generated by the encoded data device in a storage area having a capacity for storing a plurality of frames of encoded data; and an encoding controller (encoding control means) for controlling the encoded data device in such a manner that encoded data that will be generated will become an amount of data obtained by averaging residual storage capacity of a remaining area of the storage area using a number of frames of images represented by encoded data to be stored in the remaining area. (With regard to the last frame to be stored in the storage area, it is not necessarily required to so arrange it that the encoded data generated will become an amount of data obtained by averaging.)

The present invention provides also a method of controlling the above-described image data compressing apparatus. Specifically, the invention provides a method of controlling an image data compressing apparatus having an encoded data device for generating encoding data by subjecting image data representing one frame of an image to calculation of orthogonal transform coefficients, quantization of the orthogonal transform coefficients and encoding of the quantized orthogonal transform coefficients, and a storage controller for storing the encoded data generated by the encoded data device in a storage area having a capacity for storing a plurality of frames of encoded data, characterized by controlling the encoded data unit in such a manner that encoded data that will be generated will become an amount of data obtained by averaging residual storage capacity of a remaining area of the storage area using a number of frames of images represented by encoded data to be stored in the remaining area.

The present invention is such that when encoded data is stored in the storage area, the encoded data device is controlled in such a manner that the encoded will become an amount of data obtained by averaging residual storage capacity of a remaining area of the storage area using a number of image frames represented by encoded data to be stored in the remaining area. Since the encoded data is generated in accordance with the residual capacity of the remaining area in such a manner that the amount of data is averaged, it is possible to prevent a drastic change in the amount of encoded data even if there is a change of scene. Accordingly, a drastic change in image quality from frame to frame can be prevented. In addition, the amount of encoded data per unit time can be rendered substantially constant. Encoded data that has thus been stored in the storage area is applied to and recorded on a storage medium such as a memory card.

In regard to the last frame of encoded data to be stored in the storage area, the encoding controller may control the encoding data device in such a manner that the encoded data becomes an amount of data obtained by averaging, using the plurality of frames plus one frame, a capacity that is the result of adding the residual capacity of the remaining area of the storage area and the storage capacity of this storage area.

Further, in regard to the last frame of encoded data stored in the storage area, it may be so arranged that the encoding controller controls the encoded data device in such a manner that the encoded data becomes an amount of data that is less than the residual capacity of the remaining area of the storage area.

In any case, the amount of encoded data of the last frame becomes substantially constant. As a result, the image quality of the last frame can be prevented from changing drastically.

In a case where the storage area includes an apparent storage area that stores the plurality of frames of encoded data and a margin storage area that stores a prescribed amount of encoded data, the encoding controller may control the encoded data device, in regard to the last frame of encoded data to be stored in the storage area, in such a manner that the encoded data will become an amount of data that is less than twice the residual capacity of the remaining area of the apparent storage area. Since the amount of encoded data will be large for the last frame, a high image quality can be maintained for this frame.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described with reference to the drawings.

Figure 1:
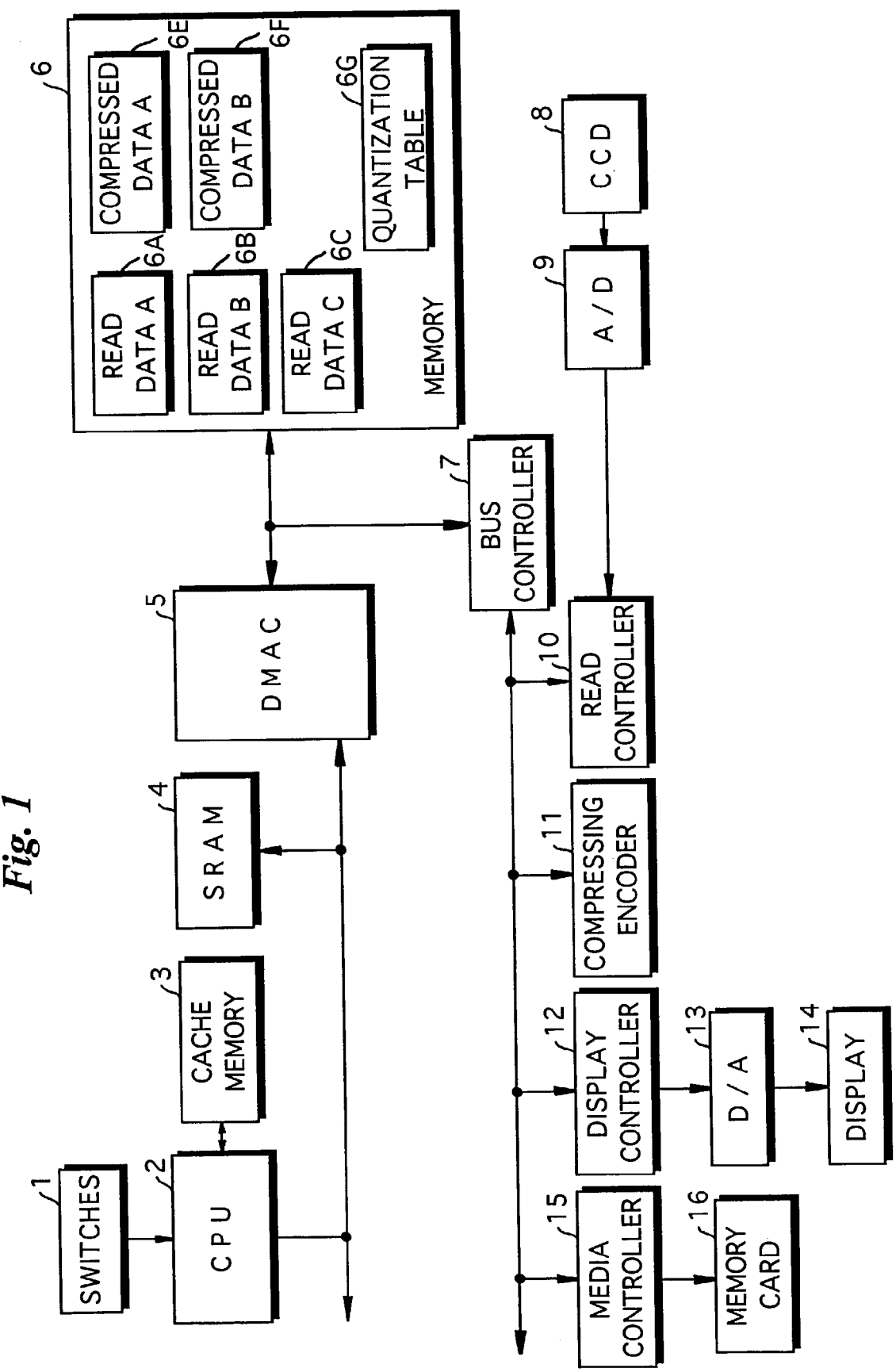
FIG. 1 is a block diagram illustrating the electrical structure of a digital camera according to an embodiment of the present invention.

FIG. 1 is a block diagram illustrating the electrical structure of a digital camera embodying the present invention.

The overall operation of the digital camera is controlled by a CPU 2.

The digital camera has switches 1 that include a mode setting switch for setting various modes such as a movie photography mode and a still photography mode, and a shutter-releaser button, etc. Various signals from the switches 1 are input to the CPU 2. A cache memory 3 for storing data temporarily is connected to the CPU 2.

The digital camera further includes a DMAC (Direct Memory Access Controller) 5. The latter controls the writing of image data, which has been obtained by imaging, to a memory 6 as well as the reading of image data that has been written to the memory 6. The digital camera further includes an SRAM (Static Random-Access Memory) 4.

The memory 6 includes three areas (read-data storage areas 6A to 6C) for storing image data representing one frame of an image, compressed-data storage areas 6E and 6F for temporarily storing encoded data (image data that has already been compressed shall be referred to as encoded data) recorded on a memory card 16 (each of the storage areas 6E and 6F has a storage capacity for storing 15 frames of encoded data), a quantization table 6G used in quantization (described later), and other storage areas.

If the movie photography mode is set by the switches 1, the image of a subject is sensed by a CCD 8 at a period of 1/30 of a second, and a video signal representing the image of the subject is output successively. The video signal is converted to digital image data in an analog/digital converting circuit 9, and the digital image data is then input to a read controller (signal processor) circuit 10. The read controller circuit 10 subjects the data to predetermined signal processing such as a gamma correction and white balance correction.

Under the control of the DMAC 5, the digital image data is applied to the memory 6 via a bus control circuit 7. The digital image data is overwritten successively one frame at a time in the read-data storage area 6A, 6B or 6C within memory 6.

The image data that has been written to the read-data storage area 6A, 6B or 6C is read frame by frame and applied to a digital/analog converting circuit 13 via the bus control circuit 7 and a display control circuit 12. The digital image data is converted to an analog video signal in the digital/analog converting circuit 13 and the analog video signal is applied to a display unit 14. The captured image of the subject is displayed on the display screen of the display unit 14.

If the shutter-release button among the switches 1 is pressed when the movie photography mode has been set, the image data obtained by imaging until the shutter-release button is pressed again is compressed and recorded on the memory card 16. More specifically, the digital camera operates as set forth below.

The image data that has been written to the read-data storage area 6A, 6B or 6C is read out successively frame by frame and input to a compressing encoding circuit 11 via the bus control circuit 7.

Figure 2:
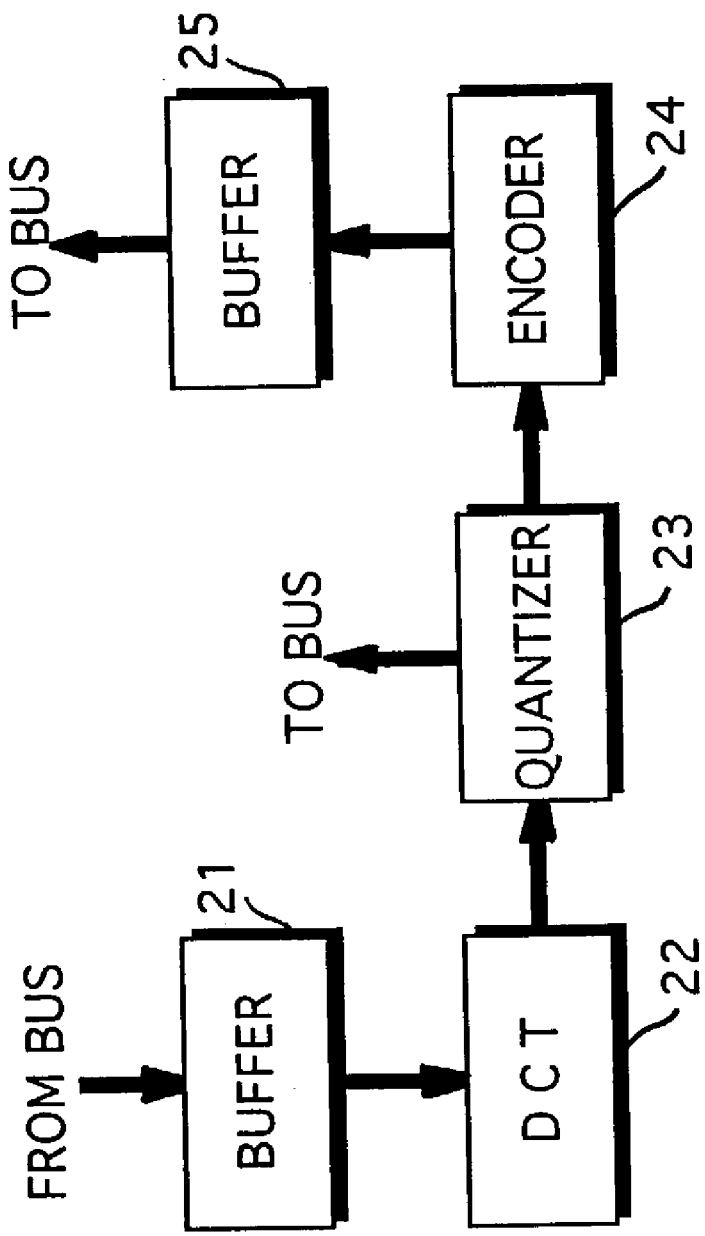
FIG. 2 is a block diagram illustrating the electrical structure of a compressing encoding circuit according to this embodiment.

FIG. 2 illustrates the details of the compressing encoding circuit 11.

Image data that has been read out of the memory 6 is applied to a DCT (Discrete Cosine Transform) circuit 22 via a buffer memory 21. The DCT circuit 22 calculates DCT coefficients (orthogonal transform coefficients) per block of 8×8 pixels and applies the calculated DCT coefficients to a quantization circuit 23, which proceeds to quantize these coefficients. The processing executed by the quantization circuit 23 will be described later in greater detail. The quantized DCT coefficients are encoded by an encoding circuit 24. The encoded image data (encoded data) is output from the compressing encoding circuit 11 via a buffer memory 25.

With reference again to FIG. 1, one frame of encoded data output from the compressing encoding circuit 11 is applied to the memory 6 via the bus control circuit 7 and is stored temporarily in the compressed-data storage area 6E. Ensuing frames of image data are compressed is similar fashion. As a result, 15 frames of encoded data come to be stored temporarily in the compressed-data storage area 6E. In the digital camera according to this embodiment, use is made of motion JPEG according to which each individual image frame is compressed in line with the JPEG standard.

When 15 frames of encoded data have been stored in the compressed-data storage area 6E, the 15 frames of encoded data are read out of the compressed-data storage area 6E and applied to a media control circuit 15 via the bus control circuit 7. The 15 frames of encoded data are recorded on the memory card 16 by the media control circuit 15. When the encoded data is being read out of the compressed-data storage area 6E, the encoded data output from the compressing encoding circuit 11 is stored in the compressed-data storage area 6F.

Figure 3:
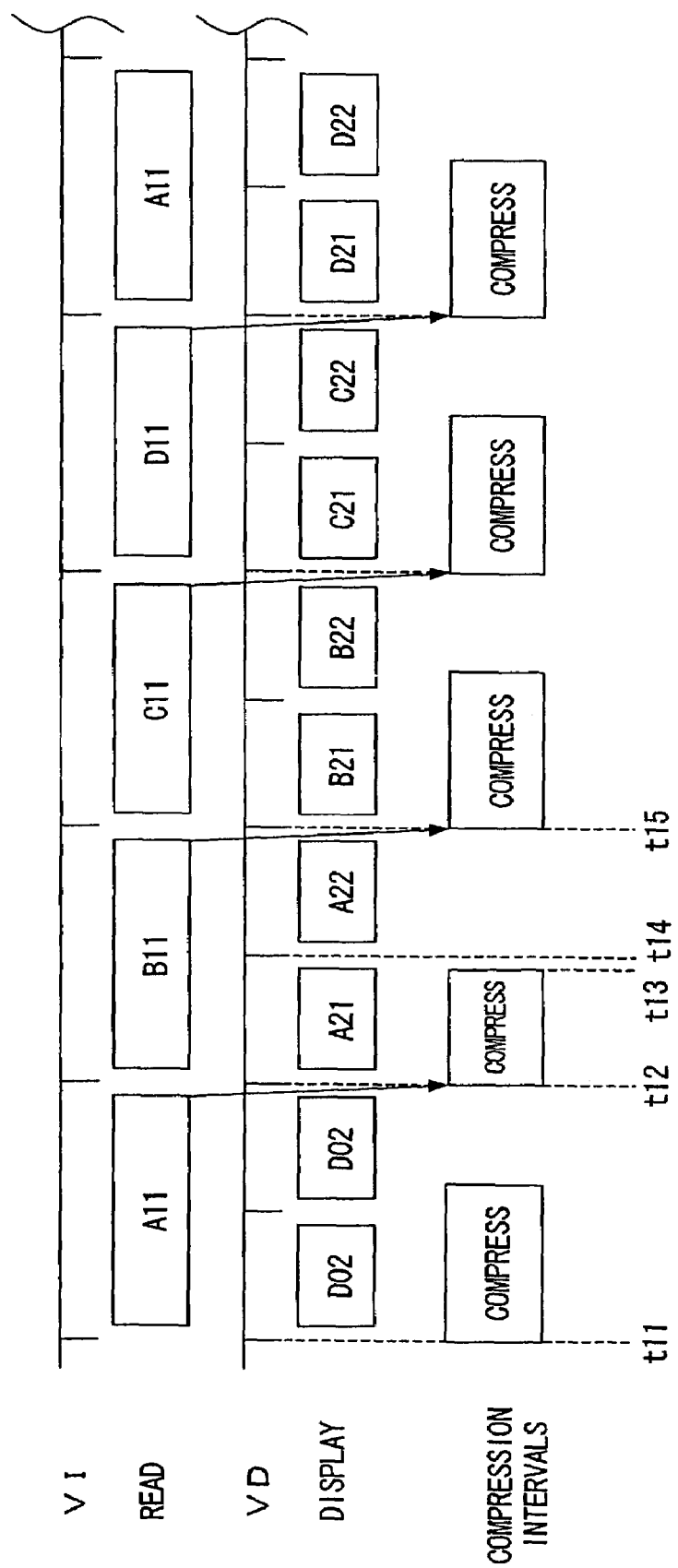
FIG. 3 is a time chart of operation of the digital camera according to this embodiment.

FIG. 3 is a time chart illustrating compression processing executed by the digital camera.

When the movie photography mode is set, the image of the subject is sensed by the CCD 8 at a period of 1/30 of a second (a read signal VI is output from the CPU 2 and applied to the CCD 8 at a period of 1/30 of a second) to obtain image data representing the image of the subject, as described above. For example, image data representing one frame of an image A11 is obtained from time t11 to time t12. The obtained image data is applied to the read-data storage area 6A and stored in the manner described above. Image data representing an image (A21) of an odd-numbered field is read out of the read-data storage area 6A from time t12 to time t14. As mentioned above, the image data is converted to an analog video signal in the digital/analog converting circuit 13 via the intermediary of the bus control circuit 7 and display control circuit 12. The analog video signal is applied to the display unit 14, whereby the image of the odd-numbered field is displayed. Image data representing an image (A22) of an even-numbered field is read out of the read-data storage area 6A from time t14 to time t15. In a manner similar to that of the odd-numbered field, the image of the even-numbered field is displayed on the display unit 14. The odd- and even-numbered fields are switched between at the period (1/60 of a second) of a vertical synchronizing signal VD so that the image of the subject is displayed.

When the reading of one frame of image data from time t11 to time 12 ends, compression processing is executed by the compressing encoding circuit 11 from time t12 to time t13. The encoded data obtained by compression is stored in the compressed-data storage area 6E.

Figure 4:
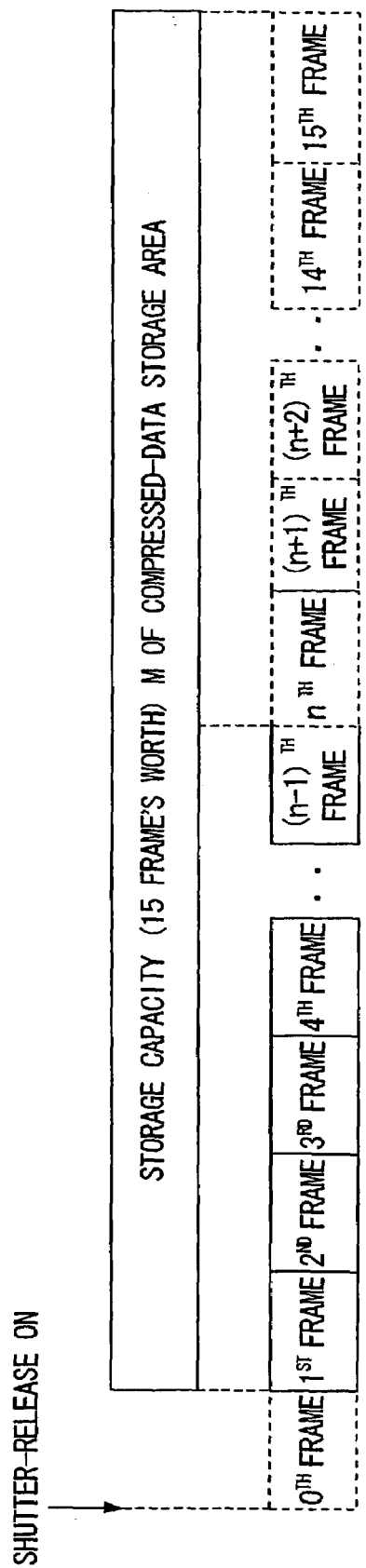
FIG. 4 illustrates a sequence through which encoded data is stored temporarily according to this embodiment.

FIG. 4 illustrates a sequence through which encoded data is stored in the compressed-data storage area 6E.

The storage capacity (represented by M) of the compressed-data storage area 6E is such that about 15 frames of encoded data can be stored, as mentioned above.

If the shutter-release button of the digital camera according to this embodiment is pressed when the camera has been set to the movie photography mode, storage of encoded data for a moving image in the compressed-data storage area 6E starts. However, the image (the image of a $0^{th}$ frame) obtained by imaging that immediately follows pressing of the shutter-release button is not stored but is utilized in calculating a normalization coefficient used in compression of the next ($1^{st}$) frame. Further, though the details will be described later, a normalization coefficient of an image to be compressed is calculated using (a) the amount of encoded data of a frame of an image that precedes the frame of the image to be compressed and (b) the target amount of encoded data of the image to be compressed.

In this embodiment, the target amount of encoded data of the image to be compressed is set to a value that is the result of dividing the capacity of the remaining area of the compressed-data storage area 6E by the number of image frames to be stored in this remaining area (i.e., by the number of remaining images). Accordingly, even if the photographic scene changes suddenly during storage of data in the compressed-data storage area 6E, a drastic change in the amount of encoded image data can be prevented before it occurs. In other words, it is possible to prevent an extreme change in the image quality of images before and after a scene change if such a scene change occurs suddenly.

By way of example, assume that encoded data representing images of $1^{st}$ to $(n-1)^{th}$ frames has been stored in the compressed-data storage area 6E and that encoded data representing the image of an $n^{th}$ frame is to be stored in the compressed-data storage area 6E in FIG. 4. In such case, the target amount of encoded data of the image of the $n^{th}$ frame is found in accordance with Equation (1) below.

target amount of encoded data={[storage capacity $M$ of compressed-data storage area]−[total amount of encoded data up to $(n-1)^{th}$ frame]}/(number of remaining frames)     (Equation 1)

Figure 5:
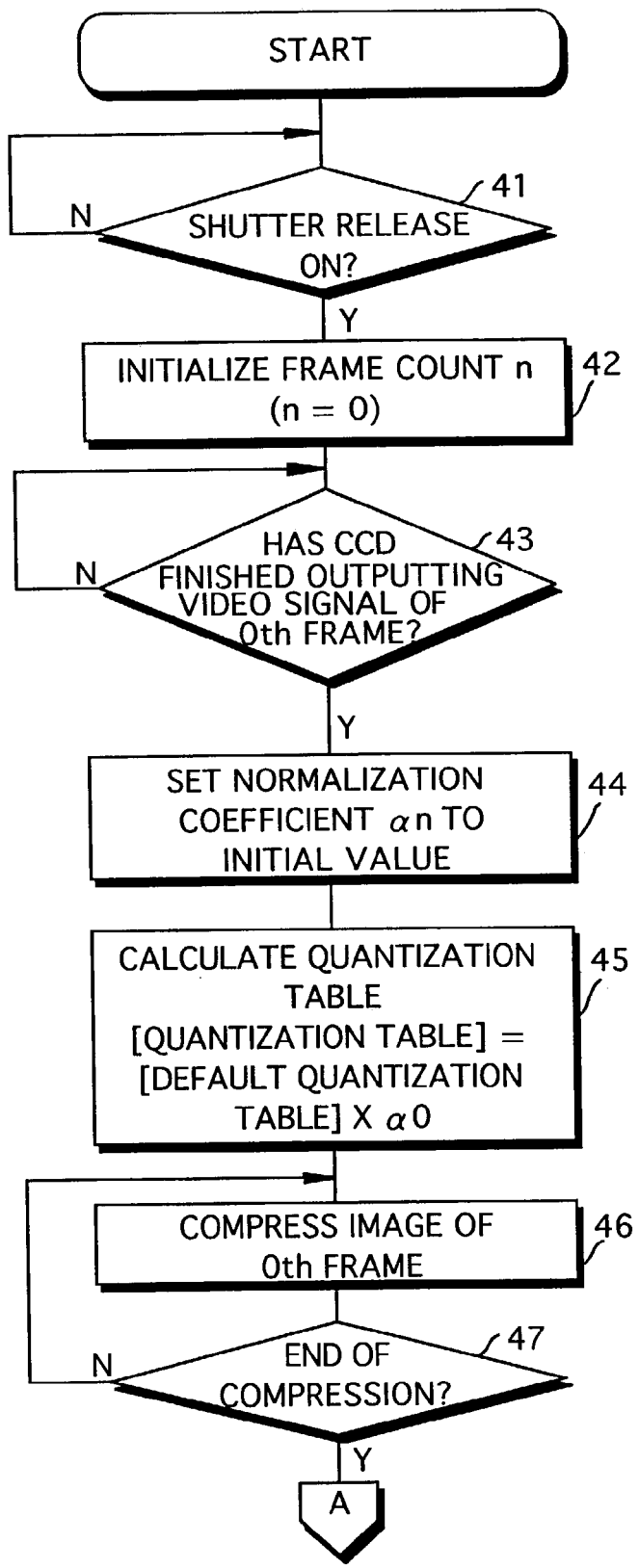
FIGS. 5 and 6 are flowcharts illustrating processing executed by the digital camera according to this embodiment.
Figure 6:
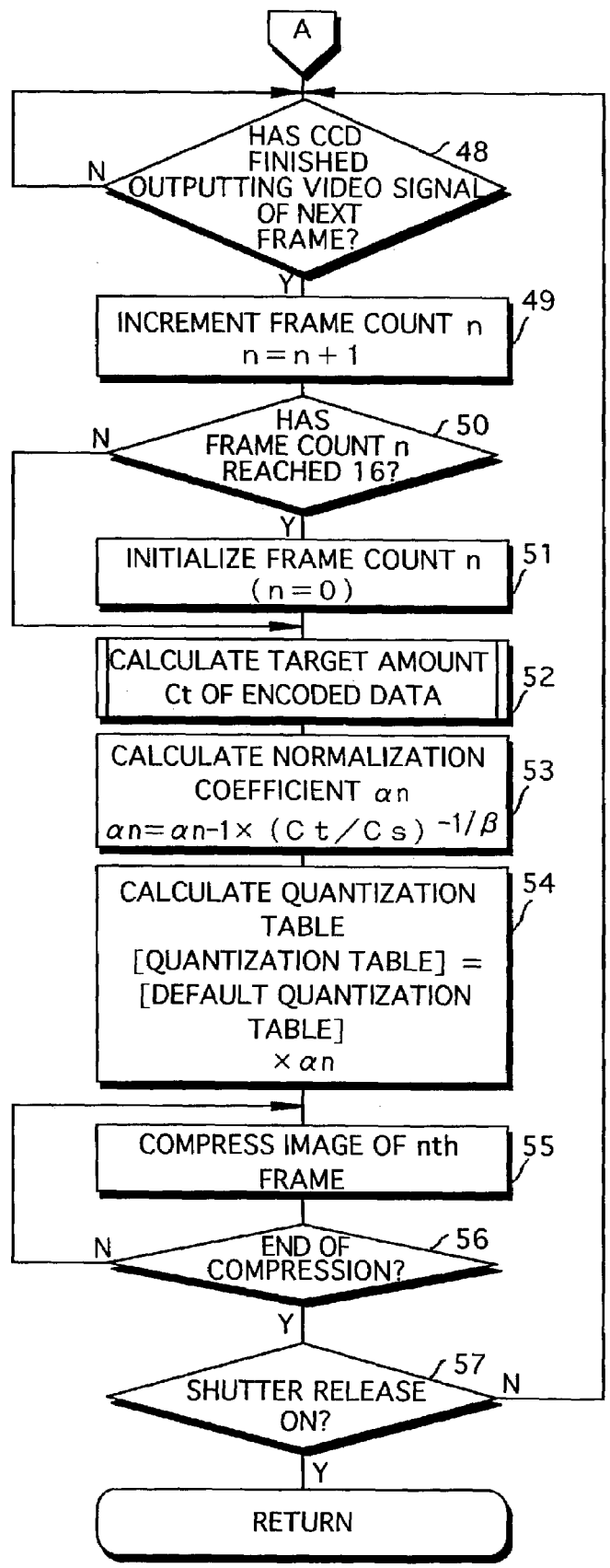

FIGS. 5 and 6 are flowcharts illustrating compression processing executed in the movie photography mode.

If the shutter-release button is pressed ("YES" at step 41) in a case where the movie photography mode has been set, the frame count n is initialized to 0 (step 42). If the image of the subject is sensed and the video signal representing the image of the $0^{th}$ frame is output from the CCD 8 (step 43), as described above, a normalization coefficient αn is set to a predetermined initial value α0 (step 44). Next, a quantization table for compressing the $0^{th}$ frame of an image is calculated in accordance with Equation (2) below (step 45).

[quantization table]=[default quantization table]×α0     (Equation 2)

When this is done, the compressing encoding circuit 11 compresses the image data representing the image of the $0^{th}$ frame (step 46). More specifically, as described above, calculation of orthogonal transform coefficients by the DCT circuit 22, quantization processing (using the calculated quantization table) by the quantization circuit 23 and encoding processing by the encoding circuit 24 are carried out in the compressing encoding circuit 11.

When processing for compressing the image data representing the image of the $0^{th}$ frame ends (step 47), the image of the subject is sensed and the CCD 8 outputs a video signal representing the image of the next frame (step 48). When output of the video signal ends ("YES" at step 48), the frame count n is incremented (step 49).

As set forth above, 15 frames of encoded data are stored temporarily in the compressed-data storage area 6E. When the frame count n becomes 16, 15 frames of encoded data come to be stored in the compressed-data storage area 6E. It is determined whether the frame count n has become 16, meaning that 15 frames of image data have already been stored in the compressed-data storage area 6E (step 50). When the frame count n becomes 16 ("YES" at step 50), 15 frames of image data will already have been stored in the compressed-data storage area 6E and therefore the frame count n is initialized to 0 (step 51). If the frame count n has not become 16 ("NO" at step 50), then the processing of step 51 is skipped in order to continue storing of encoded data in the compressed-data storage area 6E.

Next, a target amount Ct of encoded data is calculated (step 52) as described above with reference to FIG. 4. The processing for calculating the target amount Ct of encoded data will be described later in greater detail.

Next, the normalization coefficient αn used in the image data to be compressed is calculated in accordance with Equation (3) below (step 53).

α$n$=α($n$−1)×($Ct/Cs$)$^{(-1/\beta)}$     (Equation 3)

Further, a quantization table is calculated in accordance with Equation (4) below (step 54).

[quantization table]=[default quantization table]×α$n$     (Equation 4)

Image data representing the image of an nth frame is compressed using the quantization table that has been calculated (step 55). When data compression ends ("YES" at step 56), it is determined whether the shutter-release button has been pressed again (step 57).

If the shutter-release button is pressed again ("YES" at step 57), recording of moving images ends. If the shutter-release button is not pressed again ("NO" at step 57), the processing from steps 48 to 56 is repeated in order to execute processing for compressing the next frame. It goes without saying that encoded data that has been stored in the compressed-data storage area 6E (or 6F) is read out of the compressed-data storage area 6E (or 6F) and is recorded successively on the memory card, as described above.

Figure 7:
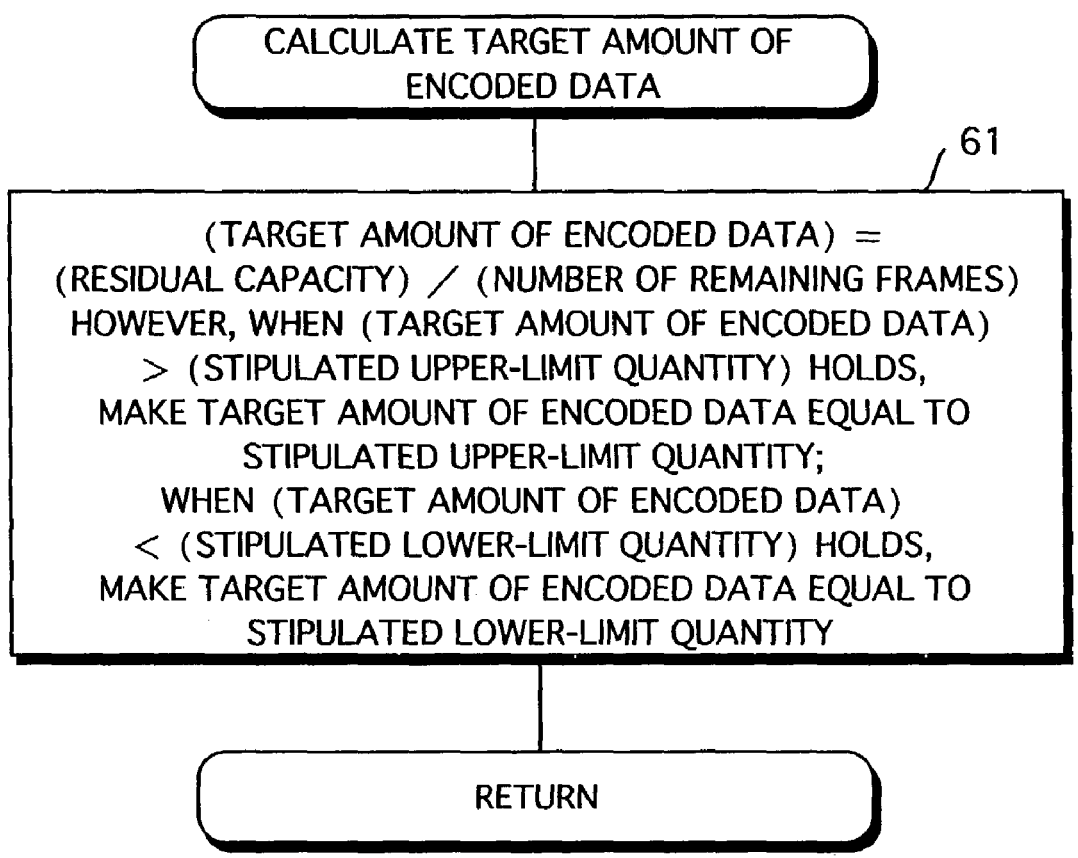
FIG. 7 is a flowchart illustrating processing for calculating a target amount of encoded data according to this embodiment.

FIG. 7 is a flowchart illustrating processing for calculation (step 52 in FIG. 6) of the target amount Ct of encoded data.

As described above with reference to FIG. 4, the target amount of encoded data of the nth frame is made a value that is the result of dividing the residual capacity of the compressed-data storage area 6E or 6F by the number of remaining frames (step 61). Of course, in order to preclude a drastic change in the amount of encoded data, a stipulated upper-limit quantity indicating the maximum amount of encoded data and a stipulated lower-limit quantity indicating the minimum amount of encoded data are defined also with regard to the target amount of encoded data. If the calculated target amount of encoded data is greater than the stipulated upper-limit quantity, then the target amount of encoded data is suppressed to the stipulated upper-limit quantity. If the calculated target amount of encoded data is less than the stipulated lower-limit quantity, then the target amount of encoded data is raised up to the stipulated lower-limit quantity.

Since the target amount of encoded data is averaged as a result of dividing the capacity of the remaining area of the compressed-data storage area by the number of images to be recorded in this remaining area, it is possible to prevent the amount of encoded data from changing in extreme fashion from one frame to the next even if the scene imaged changes.

Figure 8:
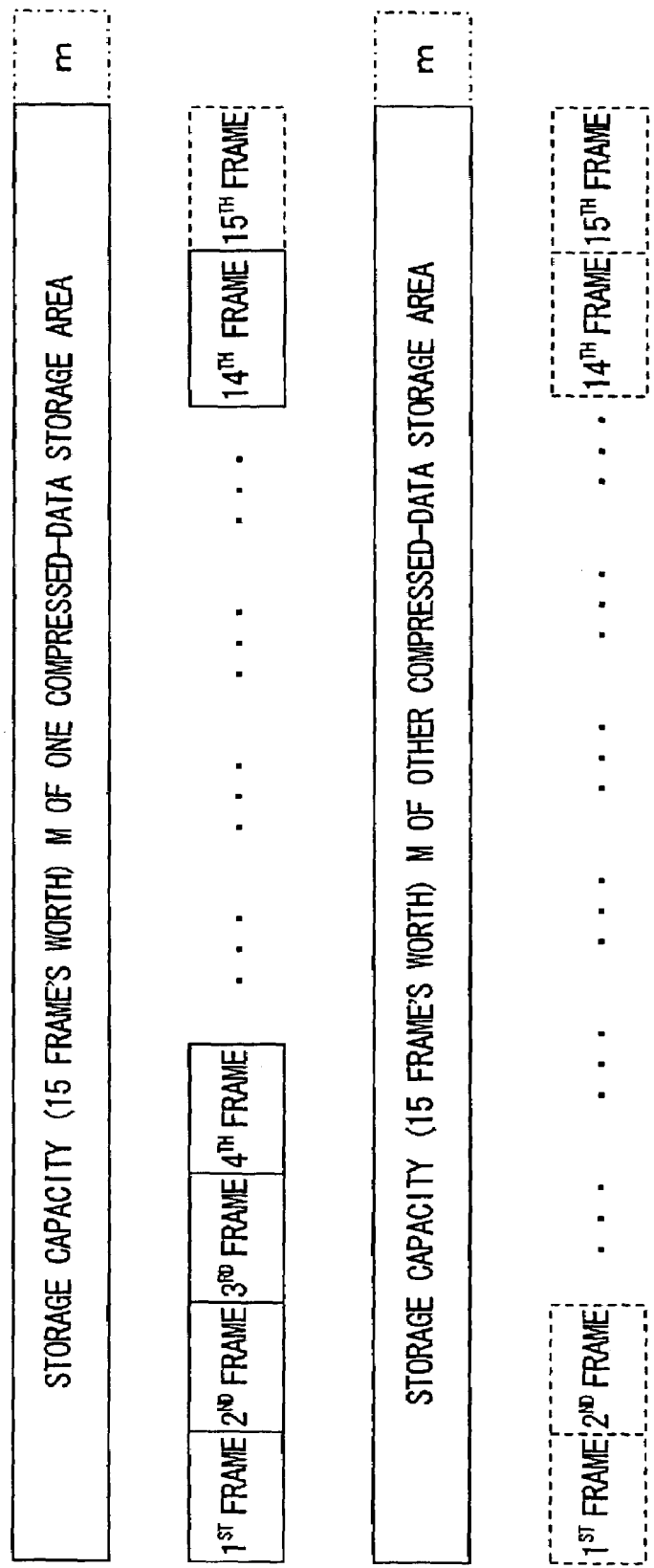
FIG. 8 illustrates a sequence through which encoded data is stored temporarily according to a modification.
Figure 9:
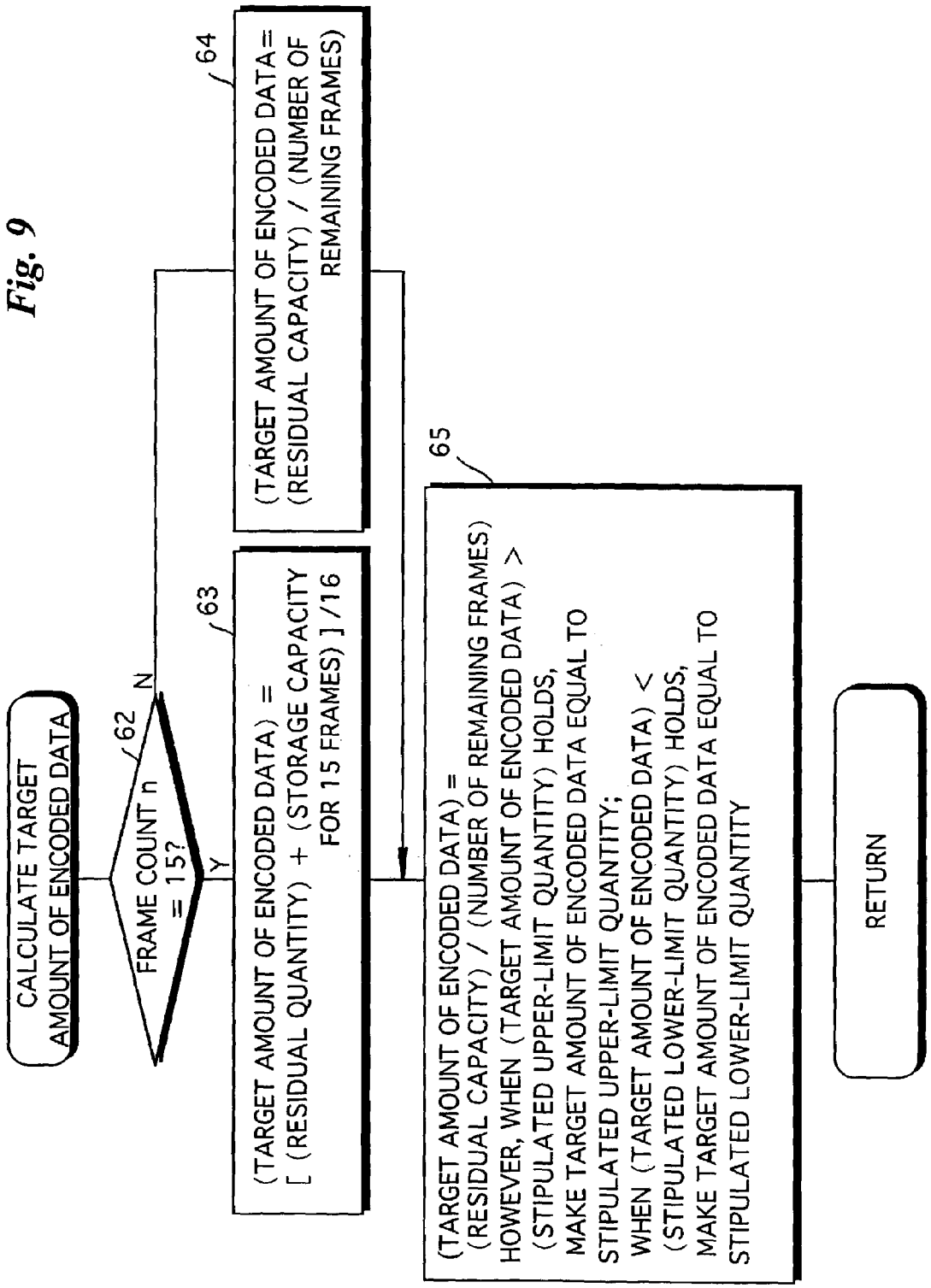
FIG. 9 is a flowchart illustrating processing for calculating a target amount of encoded data according to the modification.

FIGS. 8 and 9 illustrate a modification of this embodiment, in which FIG. 8 illustrates a sequence through which encoded data is stored in the compressed-data storage area 6E, and FIG. 9 is a flowchart showing processing for calculation (step 52 in FIG. 6) of the target amount of encoded data.

In the above-described embodiment, the target amount of encoded data of the image data to be stored is made a value that is the result of dividing the capacity of the remaining area of compressed-data storage area 6E or 6F by the number of remaining frames. According to the modification shown in FIGS. 8 and 9, however, the target amount of encoded data of the $15^{th}$ frame of an image (the last frame of the image to be stored in the compressed-image storage area) is calculated in accordance with Equation (5) below.

[target amount of encoded data of $15^{th}$ frame]={[residual capacity of one compressed-data storage area (6E or 6F)]+[storage capacity of other compressed-data storage area (6F or 6E)]}/16    (Equation 5)

The value that is the result of dividing the residual capacity of one compressed-data storage area (6E or 6F) by the number of remaining frames is made the target amount of encoded data (step 64), in a manner similar to that described above, up to the $14^{th}$ frame (frame count n=14) ("NO" at step 62).

When the $15^{th}$ frame is reached (frame count n=15) ("YES" at step 62), processing for calculating the target amount of encoded data is executed in accordance with Equation (5) (step 63). With regard to this last frame, namely the $15^{th}$ frame, the sum of the residual capacity of one compressed-data storage area and the storage capacity of the other compressed-data storage area is divided by the number of image frames (16 frames) to be stored in the area equivalent to the sum. Therefore, even if the residual capacity of one compressed-data storage area becomes small, the target amount of encoded data of the $15^{th}$ frame will not become small in conformity with the residual capacity. As a result, the amount of encoded data of the $15^{th}$ frame can be prevented from becoming very small. In other words, the image quality of the $15^{th}$ image frame can be prevented from undergoing marked deterioration. The actual storage capacity of the compressed-data storage area is greater (by a margin storage area m) than the stipulated storage capacity (the apparent storage capacity) M. Accordingly, even if the target amount of encoded data that has been calculated is greater than the residual capacity of one compressed-data storage area, the encoded data of the $15^{th}$ frame can actually be stored in one compressed-data storage area.

In this case also the calculated target value is limited to a stipulated upper-limit value if it is about to exceed this value and is limited to a stipulated lower-limit value if it is about to fall below this value (step 65).

Figure 10:
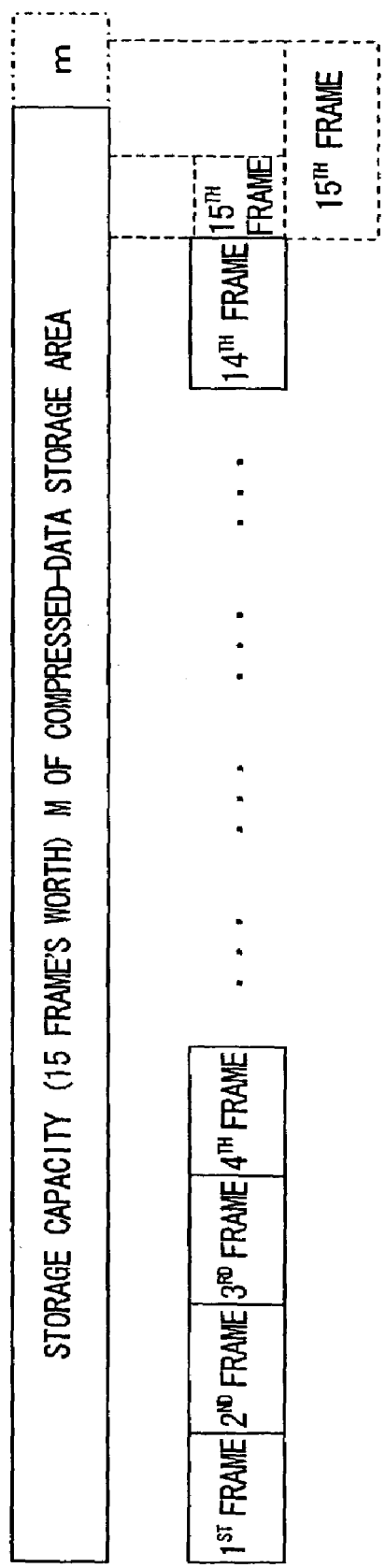
FIG. 10 illustrates a sequence through which encoded data is stored temporarily according to another modification.
Figure 11:
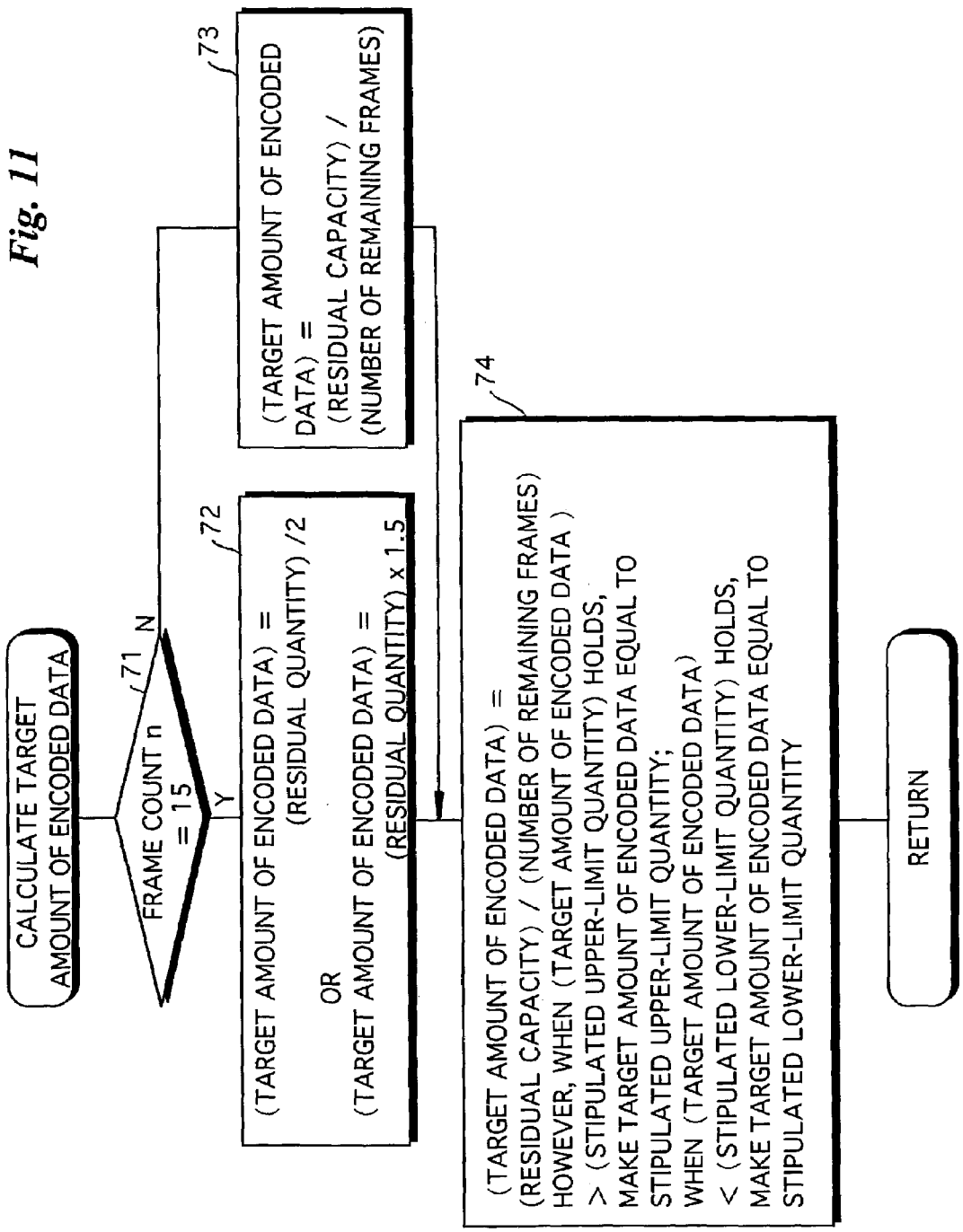
FIG. 11 is a flowchart illustrating processing for calculating a target amount of encoded data according to this other modification.

FIGS. 10 and 11 illustrate another modification of the above embodiment, in which FIG. 10 illustrates a sequence through which encoded data is stored in the compressed-data storage area 6E, and FIG. 11 is a flowchart showing processing for calculation (step 52 in FIG. 6) of the target amount of encoded data.

For the $1^{st}$ to $14^{th}$ frames, this modification also adopts a value, which is the result of dividing the remaining area of a compressed-data storage area by the number of remaining frames, as the target amount of encoded data of image data to be stored. However, the calculation indicated by Equation (6) or (7) below is performed with regard to a target amount of encoded data for the image of the $15^{th}$ frame (namely the last frame of the image to be stored in the compressed-data storage area).

[target amount of encoded data of $15^{th}$ frame]=[residual quantity of compressed-data storage area]/2    Equation (6)

[target amount of encoded data of $15^{th}$ frame]=[residual quantity of compressed-data storage area]×1.5    Equation (7)

The value that is the result of dividing the residual capacity of compressed-data storage area 6E or 6F by the number of remaining frames is made the target amount of encoded data (step 73), in a manner similar to that described above, up to the $14^{th}$ frame (frame count n=14) ("NO" at step 71).

When the $15^{th}$ frame is reached (frame count n=15) ("YES" at step 71), processing for calculating the target amount of encoded data is executed in accordance with Equation (6) or (7) (step 72). In a case where the target amount of encoded data is calculated in accordance with Equation (6), the encoded data of the last frame can always be stored in the compressed-data storage area. In a case where the target amount of encoded data is calculated in accordance with Equation (7), encoded data representing an image of high quality can be stored. This is particularly suited to playback by frame-by-frame advance since data of high-image quality can be stored.

As many apparently widely different embodiments of the present invention can be made without departing from the spirit and scope thereof, it is to be understood that the invention is not limited to the specific embodiments thereof except as defined in the appended claims.

What is claimed is:

1. An image data compressing apparatus comprising:
   an encoded data device for generating encoding data by subjecting image data representing one frame of an image to calculation of orthogonal transform coefficients, quantization of the orthogonal transform coefficients and encoding of the quantized orthogonal transform coefficients;
   a storage controller for storing the encoded data generated by said encoded data device in a storage area having a capacity for storing a plurality of frames of encoded data; and an encoding controller for controlling said encoded data device in such a manner that encoded data that will be generated will become an amount of data obtained by averaging residual storage capacity of a remaining area of the storage area using a number of frames of images represented by encoded data to be stored in said remaining area.

2. The image data compressing apparatus according to claim 1, wherein said encoding controller controls the encoded data device in such a manner that the encoded data becomes an amount of data obtained by averaging, using the plurality of frames plus one additional frame, a capacity that is a result of adding the residual storage capacity of a remaining area of the storage area and storage capacity of the storage area, in regard to a last frame of encoded data to be stored in the storage area.

3. The image data compressing apparatus according to claim 1, wherein said encoding controller controls the encoded data device in such a manner that the encoded data becomes an amount of data that is less than the residual storage capacity of a remaining area of the storage area, in regard to the last frame of encoded data stored in the storage area.

4. The image data compressing apparatus according to claim 1, wherein said encoding controller controls the encoded data device, in regard to a last frame of encoded data to be stored in the storage area, in such a manner that the encoded data will become an amount of data that is less than twice the residual storage capacity of the remaining area of an apparent storage area, in a case where the storage area includes the apparent storage area that stores the plurality of frames of encoded data and a margin storage area that stores a prescribed amount of encoded data.

* * * * *